UNITED STATES PATENT OFFICE.

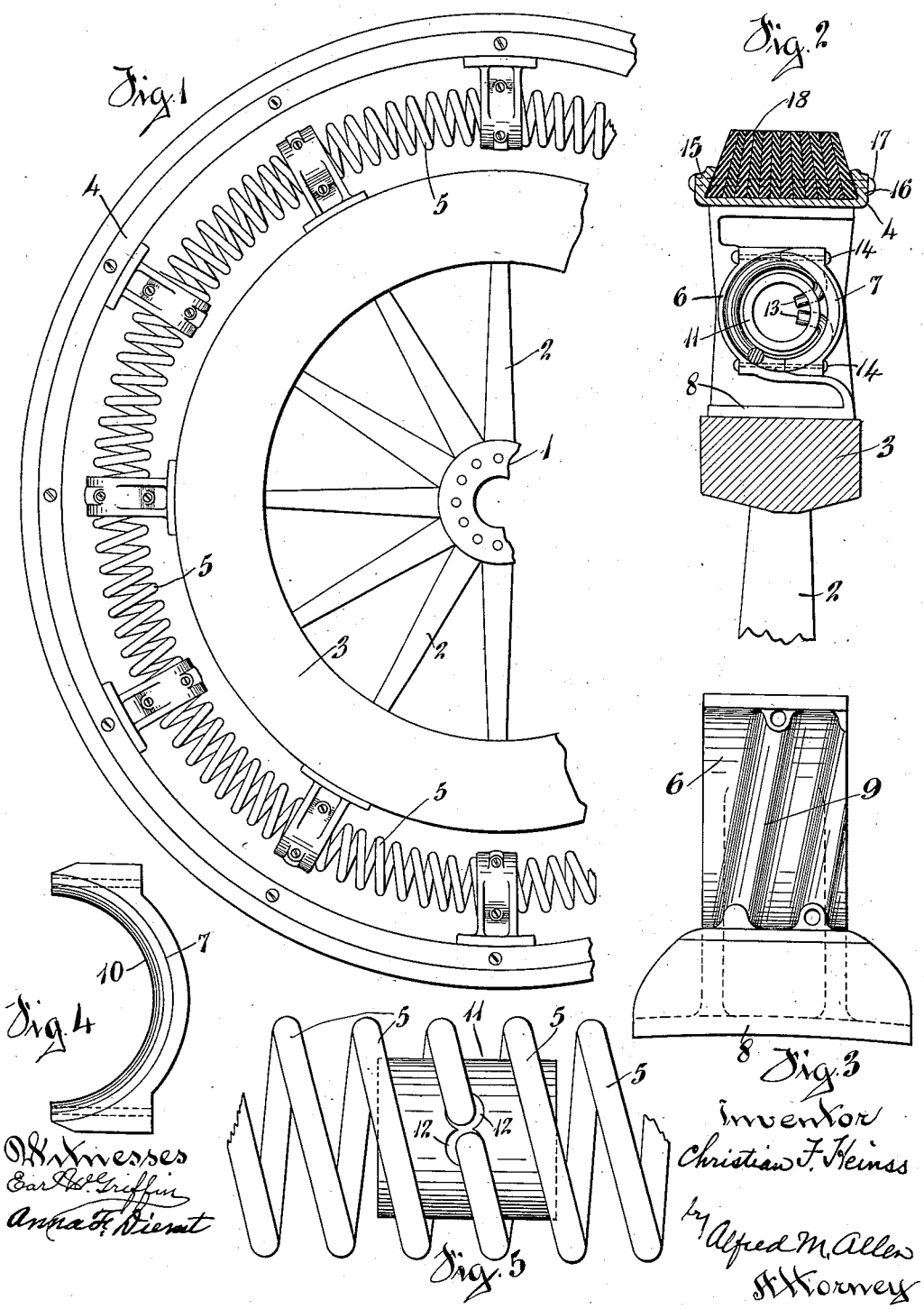

CHRISTIAN F. HEINSS, OF CINCINNATI, OHIO.

VEHICLE-WHEEL.

1,015,888.   Specification of Letters Patent.   Patented Jan. 30, 1912.

Application filed November 6, 1911. Serial No. 658,717.

*To all whom it may concern:*

Be it known that I, CHRISTIAN F. HEINSS, a citizen of the United States, and a resident of the city of Cincinnati, in the county of Hamilton and State of Ohio, have invented certain new and useful Improvements in Vehicle-Wheels, of which the following is a full, clear, and exact description, reference being had to the accompanying drawings, forming part of this specification.

The object of my invention is to provide a construction for vehicle wheels particularly adapted for automobiles, in which a series of coiled springs arranged circumferentially intermediate the felly and the floating rim of the wheel shall be provided to take the place of the ordinary pneumatic tire, and the invention consists of that certain novel construction and arrangement to be hereinafter particularly pointed out and claimed, in which a series of short coiled springs are provided, rigidly connected at the ends to lugs or clamp members extending radially and alternately in opposite directions from the felly and rim, and in which the springs are mounted lengthwise around the wheel and bearing directly between the clamps or supports, so as to be entirely free from felly or tire, whereby when in use the springs, under the weight of the vehicle and the driving power, shall be subjected alternately to compression and expansion strains to maintain a proper balance and resiliency for the wheel.

In the drawings, Figure 1 is a side elevation of a portion of my improved wheel. Fig. 2 is a cross section of the felly and rim of the wheel. Fig. 3 is an inside view of one of the clamp members for holding the springs. Fig. 4 is a side elevation of the other clamp member. Fig. 5 is a side elevation of the ends of two of the springs showing the method of locking them together.

My invention is especially applicable to automobile wheels, in which 1 represents the hub, 2, 2, the spokes, 3 the felly, and 4 the rim band of the wheel.

Interposed between the felly 3 and rim band 4 are a series of comparatively short coiled springs 5, which are arranged circumferentially of the felly and suspended between clamp members which are secured alternately to rim band and felly and project radially toward each other. These clamp members are formed in two parts, a main member 6 and a clamp plate 7. The main member 6 is provided with a base plate 8, by means of which the clamps are bolted or otherwise secured alternately to the outer periphery of the felly and the inner surface of the rim. These clamps are preferably of a width to inclose about a coil and a half of each spring, and the main member 6 is formed with a spiral ridge 9, and the coöperating plate 7 with corresponding spiral ridge 10 which register when the clamp is closed to form a spiral or threaded recess for the spring coils. To form a backing for the clamp and to hold the spring coils, as it were, in a vise, I also provide a cylinder 11 for each clamp, with an outside diameter equal to the inner diameter of the coils of the springs. One of these cylinders is employed for each clamp and a pair of holes 12, 12, are provided about midway of the length of the cylinder in which are hooked the contiguous hooked ends 13, 13, of the coiled springs.

The clamp members are bolted together by bolts 14, so that the ends of the springs are rigidly and immovably clamped and held in position. The hooking of the ends of each spring in the cylinder 11 prevents any possible creeping of the springs away from each other, and the clamp holds the springs rigid. When the coiled springs are set in place, they are curved slightly to form short segments of the circle intermediate the felly and rim, and the clamps embrace and form a complete circumferential bearing for an entire coil of each spring. By reason of this construction, there is no tendency of the springs to bulge or bend out laterally while in use. The pressure on the springs between the clamp members, whether tending to compress or expand the springs, is uniform throughout each spring.

Inasmuch as the clamps project on radial lines, the application of the pressure on the springs is not exerted between parallel pressing surfaces but between pressing surfaces at an angle to each other, and the springs themselves being curved in the arc of a circle, with the pressure applied uniformly around the entire coil with my construction there is no tendency to buckle or bend laterally under the strains when in use.

Heretofore it has been sought to use coiled springs arranged circumferentially, but such springs have been arranged with their axes in straight lines, so that heretofore such springs would tend to buckle or bend laterally when in use. The same tendency has also been met with where a single endless coiled spring has been employed. Such springs have either been held fixed on the felly, in which event the resiliency of the spring is lost, or the pressure has been applied between single points of attachment of the spring and not around the entire circumference of the coil as in my construction.

In order to provide a proper tread for the rim, I provide a strip or strips 18 of leather or other suitable material, and form the strip into a band of the circumference of the tread of the wheel by cementing or wiring together the faces of the strip or strips to form an annular band with the outer edge to serve as the tread, and the strip or strips running lengthwise of the periphery. In thus forming the band, the outer edges of the strip will necessarily be stretched, so that when cemented together, the band as a whole will be somewhat wedge shaped. The rim 4 is provided with reëntering outwardly extending flanges 15, 16, to hold the tread in place, and bolts 17 can also be used to secure the band.

In setting the tread on the rim, one flange as 15 will be first formed to form a seat for the band, and then the opposite flange 16 will be pressed into place to lock the band in position.

Having thus described my invention, what I claim as new and desire to secure by Letters Patent, is:—

1. In a vehicle wheel provided with felly and a floating rim separate from the felly, a series of coiled springs curved segmentally and arranged circumferentially intermediate the felly and rim, with means for locking together the ends of the springs to prevent creeping, and clamps secured alternately to felly and rim, and projecting radially toward each other for rigidly supporting said springs circumferentially of the coils thereof and free from the felly and rim.

2. In a vehicle wheel provided with felly and a floating rim separate from the felly, a series of coiled springs curved segmentally and arranged circumferentially intermediate the felly and rim, collars located within the abutting ends of said coils, and hooks on the ends of said coils to engage said collars to lock the springs together, and means for rigidly supporting said springs circumferentially of the coils thereof and free from the felly and rim.

3. In a vehicle wheel provided with felly and a floating rim separate from the felly, a series of coiled springs curved segmentally and arranged circumferentially intermediate the felly and rim, with means for locking together the ends of the springs to prevent creeping, and clamps secured alternately to felly and rim and projecting radially toward each other, with spiral ridges on the inner faces of said clamps to hold the coils circumferentially and free from felly and rim.

4. In a vehicle wheel provided with felly and a floating rim separate from the felly, a series of coiled springs curved segmentally and arranged circumferentially intermediate the felly and rim, collars located within the abutting ends of said coils, and hooks on the ends of said coils to engage said collars to lock the springs together, and clamps secured alternately to felly and rim and projecting radially toward each other, with spiral ridges on the inner faces of said clamps to hold the coils circumferentially and free from felly and rim.

5. In a vehicle wheel provided with a felly and a floating rim separate from the felly, a series of coiled springs curved segmentally and arranged circumferentially intermediate the felly and rim, collars located within the abutting ends of said coils, and hooks on the ends of said coils to engage said collars to lock the springs together, and clamps secured alternately to felly and rim and projecting radially toward each other, said clamps formed in two parts, one member having a base for attachment, and the other member constituting a pressure plate, to hold the coils of the springs rigidly against the collars, with the inner bearing faces of each clamp member provided with corresponding spiral ridges to embrace and hold the coils of the springs circumferentially.

CHRISTIAN F. HEINSS.

Attest:
MARSTON ALLEN,
EARL W. GRIFFIN.

Copies of this patent may be obtained for five cents each, by addressing the "Commissioner of Patents, Washington, D. C."